United States Patent

[11] 3,558,901

| [72] | Inventor | Charles J. Jacobus<br>c/o Charles Equipment Co., 17 W. 601<br>North Avenue, Hinsdale, Ill. 60181 |
|---|---|---|
| [21] | Appl. No. | 801,644 |
| [22] | Filed | Feb. 24, 1969 |
| [45] | Patented | Jan. 26, 1971 |

[54] STANDBY POWER SYSTEM
6 Claims, 1 Drawing Fig.

[52] U.S. Cl. .................................................. 290/30,
290/4, 60/52, 322/4
[51] Int. Cl. .................................................. H02k 7/02
[50] Field of Search............................................ 290/30,
30.4, 30.5, 40, 4; 322/4; 60/52(Consulted)

[56] References Cited
UNITED STATES PATENTS

| 2,983,101 | 5/1961 | Tyler............................. | 60/52X |
| 3,056,036 | 9/1962 | Gardner....................... | 290/4 |
| 3,477,013 | 11/1969 | Smith........................... | 322/32X |

*Primary Examiner*—G. R. Simmons
*Attorney*—Hofgren, Wegner, Allen, Stellman & McCord

ABSTRACT: A standby power system using a hydrostatic transmission between an AC generator and motive means which is an AC motor when external power is available, and a gas or diesel engine when external power fails. The frequency output of the AC generator is compared with a standard and deviations cause a change in the volume of fluid flowing in the hydrostatic transmission in order to return the frequency to the standard.

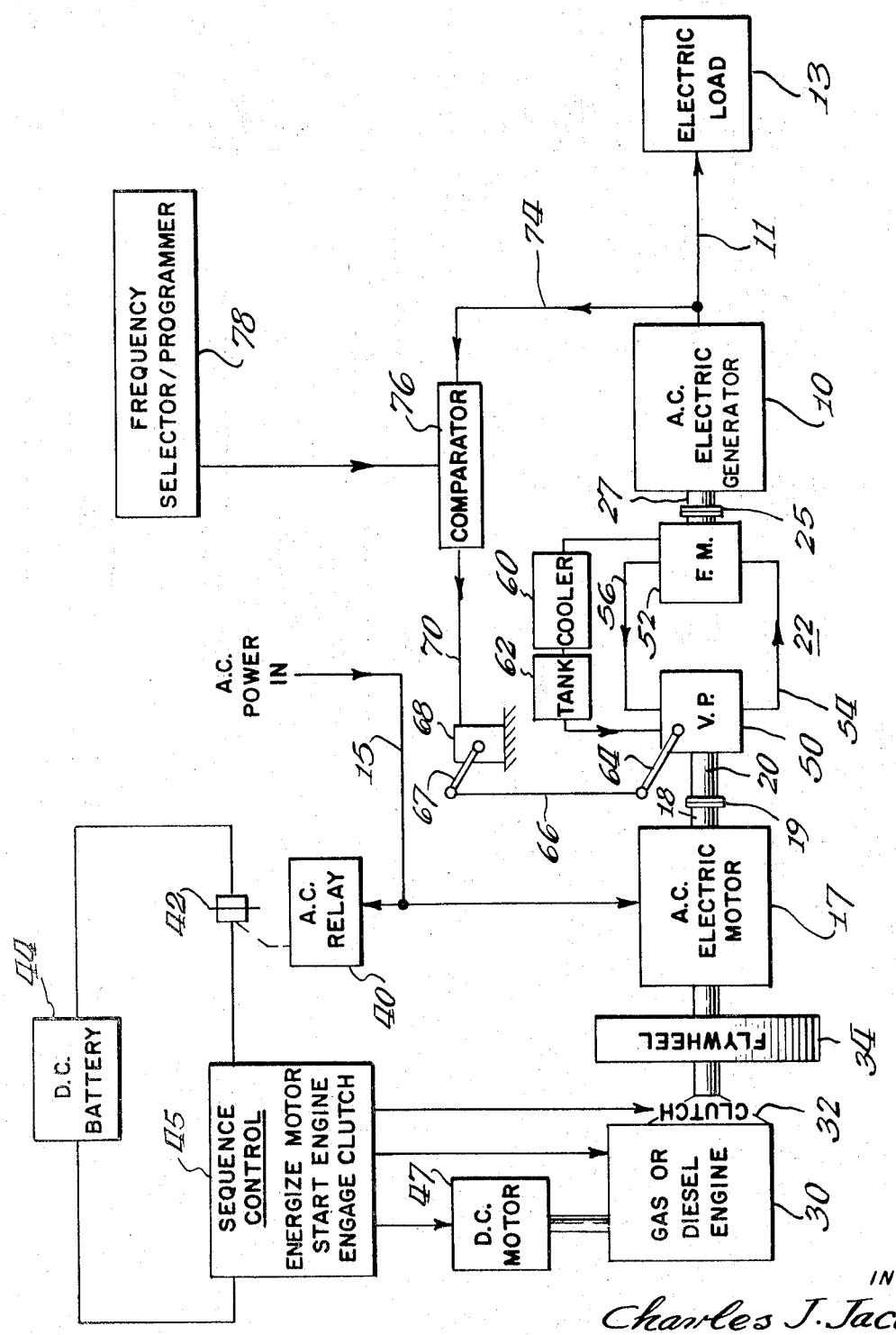

3,558,901

STANDBY POWER SYSTEM

This invention relates to a control system for an engine-generator set, and more particularly to a standby power system in which a hydrostatic transmission is used to control the electrical output from a generator.

Standby power systems typically include an AC generator for generating an AC output which is to be maintained in order to continuously energize a load. The generator is driven by an AC motor coupled to an external source of AC power, such as conventional 480 volt, 216 volt three-phase AC or two-phase AC line potential of 60 hertz frequency, for driving the generator while the external source is operative. In the event of a power failure, a standby gas or diesel engine is actuated and coupled to the AC generator in order to maintain the electric output therefrom. Various means have been used for coupling both the AC motor and the standby engine to the AC generator, such as a magnetic eddy current coupling. This and other typical couplings have a low efficiency of power transfer and are prohibitively expensive considering the relatively infrequent use with which the standby power system is needed.

In accordance with the present invention, a hydrostatic transmission is used to drive the AC generator. The use of a hydrostatic transmission in the environment of a standby power system obviates the problems of prior couplings and further substantially reduces the cost of the standby power system.

One object of this invention is the provision of an improved standby power system characterized in the use of a hydrostatic transmission as the coupling element for driving an electric generator.

Another object of the invention is the provision of a standby power system using a motor coupled to a source of external power, and a standby engine actuated when the external power source fails. Both the motor and the engine are coupled to a variable displacement pump, the output of which drives a fixed displacement motor coupled to the shaft of an electric generator. The frequency output of the electric generator is compared with a standard, and deviations are used to control the displacement of the pump in order to return the frequency to the desired standard value.

Further features and advantages of the invention will be apparent from the following description, and from the drawing in which the single FIG. is a schematic diagram of the standby power system.

While an illustrative embodiment of the invention is shown in the drawing and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

Turning to the single FIG. a standby power system is illustrated in which an AC generator 10 has an AC output on a line 11 which is coupled to an electric load 13. Power to load 13 is to be maintained constant even in the event of failure of an external source of AC power which inputs at a lead 15. Power lead 15 is coupled to an AC motor 17 which is thereby energized by the external power source as long as the source is operative. Energization of AC motor 17 rotates a motor shaft 18, which through a coupling 19 is fixedly connected to an input shaft 20 of a hydrostatic transmission 22. An output shaft 24 of transmission 22 is connected through a coupling 25 to a generator shaft 27 of AC generator 10. While AC motor 17 is energized, transmission 22 transmits torque from shaft 18 to shaft 27 to generate AC power for energizing load 13.

In the event of failure of the external source, a self-contained engine means is actuated to rotate input shaft 20 in order to replace the motive power previously provided by motor 17. This self-contained means includes a gas diesel engine 30 which operates on a fuel supply independent of electric power from lead 15. The engine 30 may be connected to input shaft 20 by any suitable means. In the illustrated embodiment, a clutch 32 is used to couple the engine shaft to a flywheel 34. Flywheel 34 in turn is coupled to motor shaft 18, so that rotation of the engine shaft produces rotation of flywheel 34 and of motor 17, which thereby rotates input shaft 20 of hydrostatic transmission 22.

Any conventional means may be utilized for actuating engine 30 upon failure of electric power. Illustratively, lead 15 is coupled to an AC relay 40 which has a normally closed contact 42. Contact 42 is connected in a series circuit with a DC battery 44 and a sequence control 45. While the external source of AC power is operative, relay 40 is energized and thus contact 42 is maintained open. Upon failure of power, relay 40 is deenergized and contact 42 closes, thereby connecting DC voltage from battery 44 to sequence control 45.

Sequence control 45 generates a series of time delayed output signals which actuate engine 30, allowing it to come up to speed, and then cause clutch 32 to engage. Typically, a DC motor 47 is provided for turning over the engine shaft in order to start self-sustaining rotation of engine 30. Sequence control 45, when actuated, first energizes DC motor 47 by coupling battery 44 in parallel therewith. Next, the engine 30 is started in a standard manner, in order that internal combustion will produce self-sustaining rotation. After a short time delay, sufficient to allow the shaft of engine 30 to come up to speed, clutch 32 is engaged, thereby connecting engine 30 to the flywheel 34. Sequence control 45, by itself, is well known and may be any conventional circuit used in standby power systems for purposes of actuating the standby motive source.

When the external source of power fails, several operations occur simultaneously. Since AC power is no longer supplied to motor 17, it begins to coast and lose speed. This has a deleterious effect on the output of generator 10, which desirably is to be maintained constant. At the same time, engine 30 is being started, however, it has not yet come up to speed and thus cannot supply the additional energy needed to maintain motor shaft 18 rotating at the necessary speed. Although flywheel 34 aids in maintaining continuous rotation of the motor shaft, it is not sufficient to maintain the output of generator 10 at the desired standard value to be maintained.

Hydrostatic transmission 22 obviates the problem by continuing to rotate output shaft 24 at the same speed even through input shaft 20 loses speed. The transmission includes a variable displacement piston pump 50 and a fixed displacement axial piston motor 52. A high pressure oil flow output from pump 50 is coupled through tubing 54 to motor 52. Return flow is provided through a low pressure oil flow tubing 56 connected from motor 52 to pump 50. In addition, part of the oil flow output from motor 52 is coupled through a cooler coil 60 to a reservoir tank 62 for supplying additional oil to pump 50. The pump 50 has adjustment means for controlling the displacement or volume of oil flow through the pump, and terminates in an arm 64 whose angular position is directly related to the volume of oil which is displaced by pump 50. Arm 64 is connected through mechanical linkage 66 to an arm 67 of an electric governor actuator 68 which converts an electrical signal on an input lead 70 into a corresponding unique angular position for arm 67.

Different characteristics of the electrical output from AC generator 10 may be controlled by means of hydrostatic transmission 22 and associated components. Illustratively, the characteristic which is to be maintained is the frequency output from generator 10. The frequency of the AC output on line 11, such as 60 hertz, in turn is directly proportional to the speed of rotation of generator shaft 27. In order to sense the frequency output, a line 74 is coupled to output line 11 and shunts the electric output to a comparator 76. The other input to comparator 76 is a frequency selector/programmer 78 which provides a standard signal of the frequency to be maintained. For a fixed frequency standard, such as 60 hertz, programmer 78 may consist of a tuning fork standard having a resonant frequency of 60 hertz or some multiple thereof, for comparison with the frequency on line 74. In the event that the frequency is to be continuously varied, or that different fixed frequency outputs from generator 10 are to be selectively chosen, programmer 78 would have corresponding frequency outputs.

Comparator 76 itself is a conventional circuit for comparing a pair of input frequencies and producing an error signal output proportional to the difference in frequency therebetween. This output, in the form of a DC signal having zero amplitude when the frequencies are the same, is coupled to line 70.

In operation, mechanical link 66 is initially adjusted so that generator 10 has a frequency output which matches that selected on programmer 78. Thereafter, as the frequency output deviates from the selected value, an error signal is produced on line 70 which causes corresponding rotation of arm 67 and hence arm 64 in order to vary the oil output of pump 50. The change in oil output is in such a direction as to cause motor 52 to rotate generator shaft 27 in a direction to return the frequency output to the desired value. When the external source of power fails, the speed of shaft 18 will begin to slowdown. This slowdown will momentarily be transmitted to generator 10 and cause the frequency to drop slightly. Comparator 76 will then produce an error signal which will move arm 67 and 64 in such a direction as to increase the displacement of pump 50, thereby causing fixed displacement motor 52 to increase speed of rotation and return the frequency output of generator 10 to the desired value. Thus, hydrostatic transmission 22 maintains the output of generator 10 constant even over a considerable range of speed of rotation of input shaft 20, as occurs while the standby engine is coming up to speed.

When the power system is to be used to supply a plurality of frequency outputs, as selected by programmer 78, additional components may be added to the system to control other variables. For example, different speeds of rotation of an AC generator typically produces different output voltages in addition to different output frequencies. If the voltage to load 13 is to be maintained constant, conventional means of voltage regulation may be inserted in line 11 in order to maintain the voltage at a fixed output value for changes in input value. Other similar modifications will be apparent to those skilled in the art.

I claim:

1. A standby power system for use when an external source of electric power fails, comprising:

generating means having an electric output which is to supply electric power in the event of failure of said external source;

hydrostatic transmission means having an input shaft, an output shaft coupled to said generating means to cause said generating means to produce said electric output with a characteristic varying in proportion to the speed of rotation of said output shaft, and adjustment means for selecting different speeds of rotation of said output shaft for a given speed of rotation of said input shaft;

self-contained, fuel powered engine means actuable to rotate an engine shaft independent of electric power from said external source;

flywheel means;

means coupling both said flywheel means and said engine shaft to said input shaft;

failure sensing means responsive to failure of said external source for actuating said engine means;

comparator means coupled to the electric output of said generating means for producing a command in proportion to deviation of said characteristic from a desired characteristic of said electric output; and actuator means responsive to said command for varying said adjustment means until the characteristic of said electric output corresponds to the desired characteristic.

2. The standby power system of claim 1 including electric motor means coupled to and energized by said external source for rotating an electric motor shaft, and additional coupling means coupling said motor shaft to said input shaft to cause said external source to supply motive power to said generating means through said hydrostatic transmission means while said external source is operative.

3. The standby power system of claim 1 wherein said hydrostatic transmission means includes variable displacement pump means coupled to said input shaft, fixed displacement motor means coupled to said output shaft, means including a source of fluid for interconnecting said pump means and said motor means, said adjustment means selecting different displacements of fluid by said pump means to thereby vary the amount of fluid to said fixed displacement motor means.

4. The standby power system of claim 1 wherein the characteristic of said electric output corresponds to the frequency of the electric output, said comparator means comparing the frequency of said generating means with a predetermined frequency to produce an error command in proportion to the difference therebetween, and said actuator means producing a mechanical motion in direct proportion to said error command in order to control said adjustment means.

5. The standby power system of claim 1 wherein said hydrostatic transmission means includes pump means having a variable displacement dependent upon the angular position of an arm corresponding to a part of said adjustment means, said pump being coupled to said input shaft, fixed displacement motor means driven by said pump means for rotating said output shaft, said comparator means producing an electrical error command in proportion to deviate of the characteristic from said desired characteristic, and said actuator means comprises an electrical-to-mechanical means converting said electrical error command into a mechanical movement for controlling the angular position of said arm.

6. The standby power system of claim 5 wherein the characteristic of said electric output is frequency, a source of frequency corresponding to said desired characteristic, and said comparator means comprises means for comparing the frequency of said source with the frequency of said generating means to produce an electrical error signal corresponding to said command.